(12) United States Patent
Walossek et al.

(10) Patent No.: US 11,926,348 B2
(45) Date of Patent: Mar. 12, 2024

(54) METHOD AND DEVICE FOR CONTROLLING APPLICATIONS DISTRIBUTED BETWEEN A VEHICLE AND A CLOUD

(71) Applicant: Robert Bosch GmbH, Stuttgart (DE)

(72) Inventors: Erik Walossek, Giesen (DE); Frederik Blank, Ludwigsburg (DE); Kurt Eckert, Ditzingen (DE); Alexander Geraldy, Hildesheim (DE); Behzad Benam, Leonberg (DE); Jan Wolter, Hannover (DE); Jens Schwardmann, Hildesheim (DE); Karl Theo Floess, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 151 days.

(21) Appl. No.: 17/422,925

(22) PCT Filed: Feb. 13, 2020

(86) PCT No.: PCT/EP2020/053785
§ 371 (c)(1),
(2) Date: Jul. 14, 2021

(87) PCT Pub. No.: WO2020/200560
PCT Pub. Date: Oct. 8, 2020

(65) Prior Publication Data
US 2022/0089182 A1    Mar. 24, 2022

(30) Foreign Application Priority Data
Apr. 5, 2019 (DE) .......... 102019204940.0

(51) Int. Cl.
*B60W 60/00* (2020.01)
*G07C 5/00* (2006.01)

(52) U.S. Cl.
CPC ........ *B60W 60/005* (2020.02); *B60W 60/001* (2020.02); *G07C 5/008* (2013.01)

(58) Field of Classification Search
CPC .... B60W 60/005; B60W 60/001; G07C 5/008
See application file for complete search history.

(56) References Cited

U.S. PATENT DOCUMENTS 6,505,100 B1   1/2003   Stuempfle et al.
9,465,388 B1   10/2016  Fairfield et al.
(Continued)

FOREIGN PATENT DOCUMENTS

CN   109118758 A      1/2019
DE   102015118489 A1  5/2016
(Continued)

OTHER PUBLICATIONS

International Search Report for PCT/EP2020/053785, dated May 29, 2020.

*Primary Examiner* — Vivek D Koppikar
*Assistant Examiner* — Jeffrey R Chalhoub
(74) *Attorney, Agent, or Firm* — NORTON ROSE FULBRIGHT US LLP; Gerard A. Messina (57) ABSTRACT

A method for controlling applications distributed between a vehicle and a cloud. A supervision of communication channels between the vehicle and the cloud is carried out. Based on the supervision, a control and adaptation of a component of the applications operated in the vehicle or of a component of the applications operated in the cloud are carried out.

9 Claims, 8 Drawing Sheets

(56) References Cited

U.S. PATENT DOCUMENTS

| | | | |
|---|---|---|---|
| 9,494,935 | B2 | 11/2016 | Okumura et al. |
| 9,720,410 | B2 | 8/2017 | Fairfield et al. |
| 9,767,369 | B2 | 9/2017 | Furman et al. |
| 2014/0277850 | A1 | 9/2014 | Jobs et al. |
| 2016/0139594 | A1 | 5/2016 | Okumura et al. |
| 2017/0106876 | A1 | 4/2017 | Gordon et al. |
| 2018/0237040 | A1* | 8/2018 | Mong .................. H04L 67/61 |
| 2019/0079659 | A1* | 3/2019 | Adenwala ........... G06F 3/04842 |

FOREIGN PATENT DOCUMENTS

| | | | |
|---|---|---|---|
| EP | 1033691 | A2 | 9/2000 |
| WO | 2011026652 | A2 | 3/2011 |

* cited by examiner

METHOD AND DEVICE FOR CONTROLLING APPLICATIONS DISTRIBUTED BETWEEN A VEHICLE AND A CLOUD

FIELD

The present invention relates to a method for controlling applications distributed between a vehicle and a cloud. The present invention also relates to a corresponding device, to a corresponding computer program and to a corresponding memory medium.

BACKGROUND INFORMATION

Semi-autonomous vehicles according to the related art require a vehicle driving interface ("driver workstation") as well as a person fit to drive and authorized to drive the vehicle as the vehicle occupant, who is able to take over the driving when needed. The object of numerous research projects involves so-called teleoperated driving (ToD), in which the vehicle may be assisted by means of a remote control when managing challenging scenarios—such as detours via dirt roads, alternative and unconventional routes or the like—or the driving task may be temporarily or fully taken over by an external operator in a control center, the so-called teleoperator. Vehicle and control center or their operators are interconnected for this purpose by a mobile communications network usually having a low latency and a high data rate.

U.S. Pat. No. 9,494,935 B2 describes computer devices, systems and methods for the remote control of an autonomous passenger vehicle. If an autonomous vehicle encounters unexpected surroundings such as, for example, a road construction site or an obstacle, which is unsuited for autonomous operation, the vehicle sensors are able to detect data about the vehicle and the unexpected surroundings, including image data, radar data and LIDAR data, etc. The detected data may be sent to a remoter operator. The remote operator may remotely operate the vehicle manually or issue instructions to the autonomous vehicle, which are to be carried out by various vehicle systems. The detected data sent to the remote operator may be optimized in order to save bandwidth, for example, by sending a limited subset of the detected data.

A vehicle according to U.S. Pat. No. 9,767,369 B2 may receive one or multiple image(s) of surroundings of the vehicle. The vehicle may also receive a surroundings map. The vehicle may also compare at least one feature in the images to one or multiple feature(s) in the map. The vehicle may also identify a certain area in the one or the multiple image(s), which corresponds to a portion of the map situated at a threshold distance from the one or the multiple feature(s). The vehicle may also compress the one or the multiple image(s) in order to record a smaller number of details in areas of the images than in the given area. The vehicle may also provide the compressed images to a remote system and, in response thereto, receive operating instructions from the remote system.

Systems and methods according to U.S. Pat. No. 9,465,388 B1 enable an autonomous vehicle to request assistance from a remote operator when the confidence of the vehicle in the operation is low. One exemplary method encompasses the operation of an autonomous vehicle in a first autonomous mode. The method may also encompass the identification of a situation in which a confidence level of an autonomous operation in the first autonomous mode is below a threshold value level. The method may furthermore encompass the sending of a request for assistance to a remote assistant, the request including sensor data representative of a portion of the surroundings of the autonomous vehicle. The method may additionally encompass the reception of a response from the remote assistant, the response indicating a second autonomous operating mode. The method may also effectuate that the autonomous vehicle operates in the second autonomous operating mode according to the response from the remote assistant.

U.S. Pat. No. 9,720,410 B2 describes a further method for remotely assisting autonomous vehicles in predetermined situations.

SUMMARY

The present invention provides a method for controlling distributed applications between a vehicle and a cloud, to a corresponding device, to a corresponding computer program and to a corresponding memory medium.

The approach according to an example embodiment of the present invention is based on the finding that—as in other technology sectors—the connectivity in the automotive sector also becomes increasingly important. Thus, an increasing number of vehicles acquire the ability to establish connections to a backend in the cloud and to provide or to receive data for various applications. Most of these applications are configured merely to exchange pieces of information with the aforementioned cloud, and applications such as, for example, remote diagnosis, use these data in order to provide functions based on the same data. In individual cases, vehicle functions in the narrower sense may already be carried out in the cloud: In newer vehicle generations, for example, a voice assistant detects the speech of the vehicle occupants based on sound signals, sends these to the cloud where it carries out an analysis and sends the identified words back to the vehicle, where—based on the identified words and their semantics—particular vehicle functions are activated or carried out.

The approach described below is based further on the insight that communication links between vehicle and cloud according to the related art are usually based on minimal benefit promises with respect to quality of service (QoS), which allow the connectivity to be maintained as well as possible but never guarantee availability and performance everywhere and at all times. For processes including high demands on the functional reliability, in particular, it is important to have concepts that convey at least constant knowledge about the connection status or which even permit the relevant communication channel to be controlled with respect to its through-put and its quality of service.

The method provided takes vehicle functions distributed in such a way into account, which are no longer limited to the vehicle domain, but are performed partially in the cloud and partially in the vehicle. According to the related art, applications distributed in this way are limited to convenience and support functions due to technical constraints, which the approach according to the present invention seeks to overcome. Thus, according to the related art, it appears hardly possible for applications distributed in the above-described manner to assume basic vehicle functions such as its engine management and control or driver assistance functions.

Against this background, the advantages of the approach according to the present invention lie in the exploitation of a significant savings potential, since functions that require high power and thus a costly vehicle control unit (electronic control unit, ECU) are able to be carried out more efficiently in the backend and with lower hardware costs. In addition, one specific embodiment of the present invention even allows new functions to be provided which, for example, use pieces of information from other vehicles in order to improve the operability of a vehicle, for example, by engine management of electric vehicles based on the availability and status of charge devices and on the status of other electric vehicles. Finally, one embodiment of the present invention is able to contribute to the prevention of expensive recall actions, since a major part of the functionality is situated in the backend and is thus able to be optimized and corrected without recalling every affected vehicle. Such an expansion of the distributed functions is enabled by the control and supervision according to the present invention of the availability of the connection to the backend.

Advantageous refinements of and improvements on the basic example embodiment of the present invention are possible with the measures described herein. Thus, it may be provided that the applications controlled according to the present invention allow a teleoperated driving. In this case, a major portion of the vehicle control is carried out in the backend; for example, a teleoperator could virtually "overwrite" the perception of an autonomous vehicle by establishing a new movement path for the trip and thus assist the vehicle in overcoming problematic areas or situations. In the extreme case, an operator could fully maneuver the vehicle from the control center. This may be necessary, for example, if an autonomous vehicle is in a difficult position due to a challenging traffic situation or to some other problem, and must be activated again for autonomous driving by the teleoperator temporarily maneuvering it through the problematic area.

BRIEF DESCRIPTION OF THE DRAWINGS

Exemplary embodiments of the present invention are represented in the figures and described in greater detail below.

DETAILED DESCRIPTION OF EXAMPLE EMBODIMENTS

Figure 1:
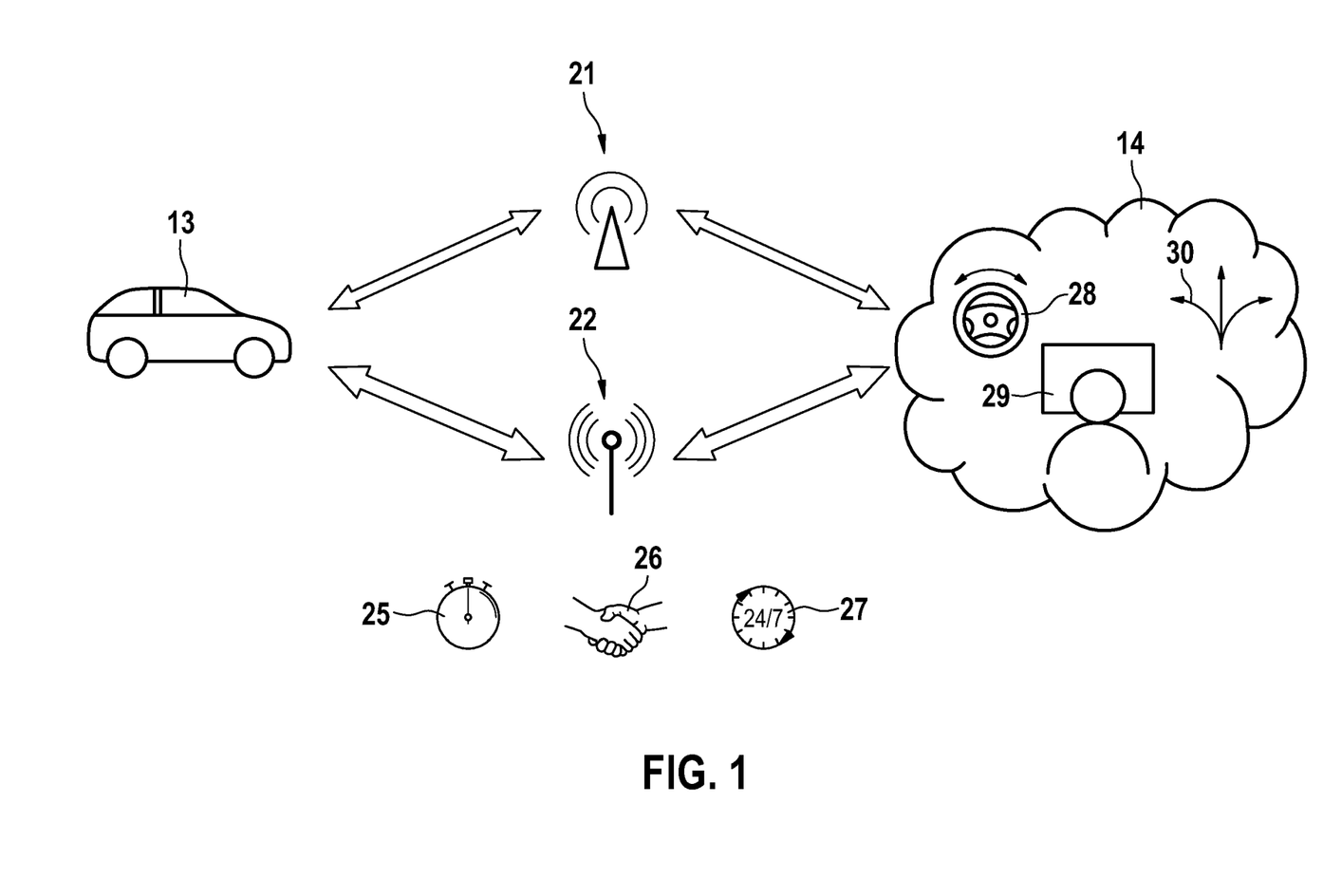
FIG. 1 shows a vehicle connected by two communication channels to a cloud.

The general approach of the method described herein is to provide means, which enable a targeted influencing, control, supervision and utilization of a communication channel in accordance with the requirements of functions or applications that are distributed between cloud and vehicle. In addition, applications are able to adapt their functionality to the instantaneous status of the communication channel. If more than one communication channel is available—for example, in the case of parallel communication at different frequencies having different coding and radio access—, these communication channels may sometimes exhibit a type of orthogonality. The more pronounced the orthogonality, the less the likelihood is that a problem occurs on both channels simultaneously and at the same location. This orthogonality is utilized according to the present invention to improve the overall power of the communication if both channels are available simultaneously as communication means for a function. An overview is provided by FIG. 1.

Figure 2:
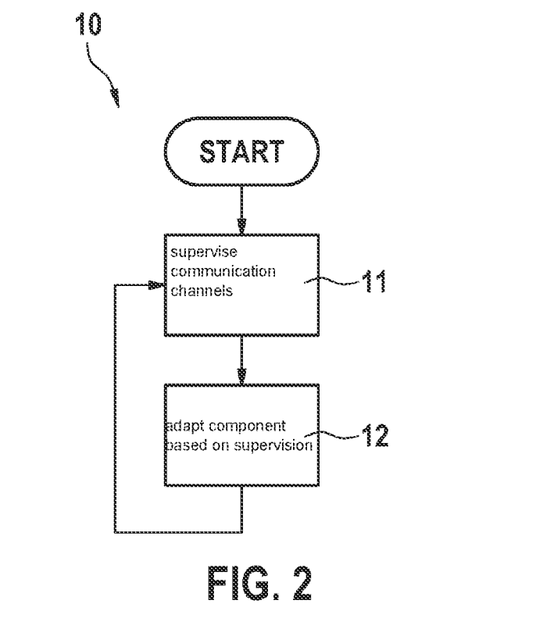
FIG. 2 shows a flowchart of one example method for controlling distributed applications in accordance with the present invention.
Figure 3:
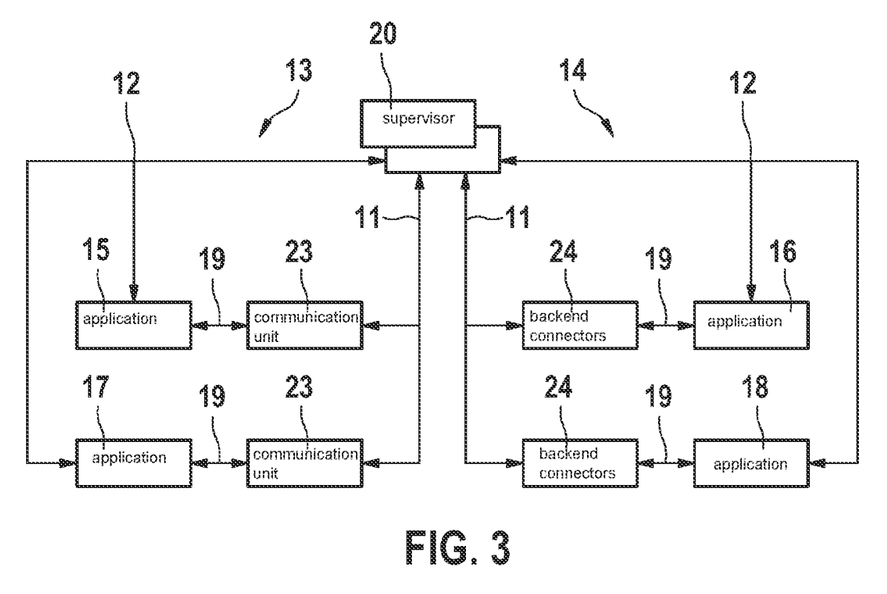
FIG. 3 schematically shows the architecture of a control program according to an example embodiment of the present invention.

FIG. 2 illustrates a method 10 suitable for such purpose, the sequence of which is explained below with reference to the system depicted at a high level of abstraction in FIG. 3. In order to supervise and to control the application, a type of supervision unit (hereinafter: "supervisor") is required. This application supervisor 20 supervises (process 11—FIG. 2) permanently and in real time the communication conditions for the various available communication channels 21, 22 and decides based on the supervised capabilities and the quality of these communication channels 21, 22 how the function is to be adapted to the communication capabilities or the communication to the requirements of the respective application 15, 16, 17, 18 (process 12—FIG. 3). Data exchanges 19 are provided between applications, 15, 17 and communication units 23, or between applications, 16, 18 and backend connectors 24. Supervisor 20 is thus able to take the functional safety requirements of applications 15, 16, 17, 18 into consideration. Application supervisor 20 is located possibly in vehicle 13, in the backend or is even distributed between vehicle 13 and the backend. There may be multiple applications 15, 16, 17, 18, communication units 23, and backend connectors 24 which are controlled and adapted by a shared supervisor 20; it is equally possible that multiple supervisors 20 are available and supervision 11 and adaptation 12 take place in a separate or coordinated manner.

Figure 4:
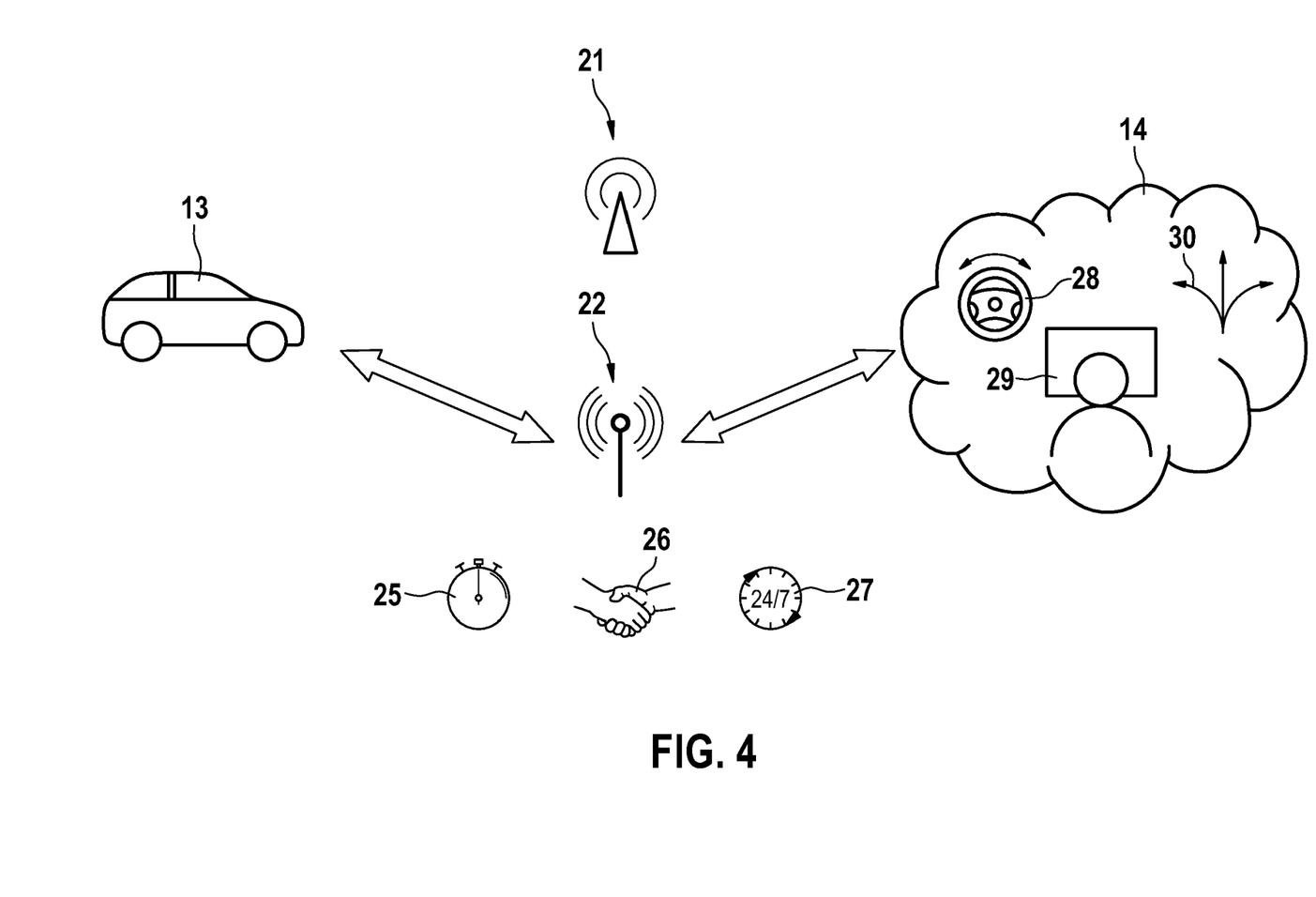
FIG. 4 shows a first application of the control program represented in FIG. 3.

FIG. 4 illustrates the aspect of a possible switch between communication channels 21, 22. In this application, supervisor 20 supervises channels 21, 22 and decides whether the one or the other channel 21, 22 is used. This takes place dynamically on the basis of a continuous or at least regular supervision 11 of channels 21, 22 and corresponding adaptation 12 of their functionalities. In this case, parameters such as the communication waiting time (latency 25), communication safety or reliability 26 inversely proportional to the probability of error, availability 27 of communication channels 21, 22 inversely proportional to the probability of a communications failure, or the data capacity available for the communication may be taken into consideration. Supervisor 20 should potentially prepare applications 15, 16, 17, 18 for a pending switch depending on the duration of the switching process and adapt the respectively other communication channel 21, 22 to switching applications 15, 16, 17, 18. In this case as well, supervisor 20 is therefore able to take functional safety requirements of applications 15, 16, 17, 18 into consideration.

Figure 5:
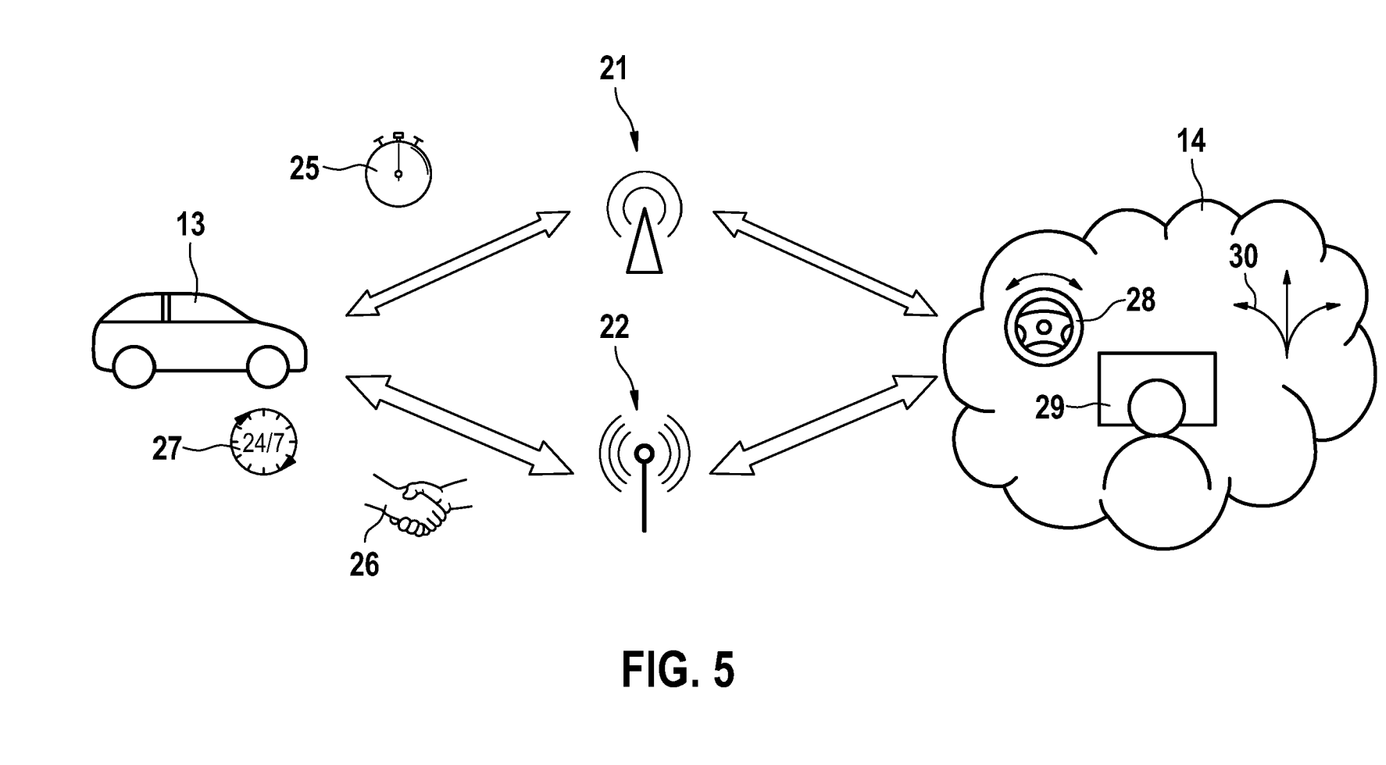
FIG. 5 shows a second application of the control program represented in FIG. 3.

FIG. 5 illustrates the aspect of a parallel use of redundant communication channels 21, 22 using a function data classification: If multiple channels 21, 21 are used simultaneously in this manner, application supervisor 20 in the present application divides the communication types of applications 15, 16, 17, 18, which it controls based on their requirements—for example, with respect to latency 25, data throughput and data security or reliability 26—into various classes and dynamically assigns these classes to communication channels 21, 22 controlled and managed by the supervisor. Thus, it is possible to utilize available channels 21, 22 highly efficiently and optimally adapted to the requirements of the function. The classification of the application data and the distribution thereof to available channels 21, 22 takes place dynamically on the basis of their continuous or at least regular supervision 11 and corresponding adaptation 12 of the functions. In this way, application supervisor 20 is able to take the functional safety requirements of applications 15, 16, 17, 18 into consideration in this case as well.

Figure 6:
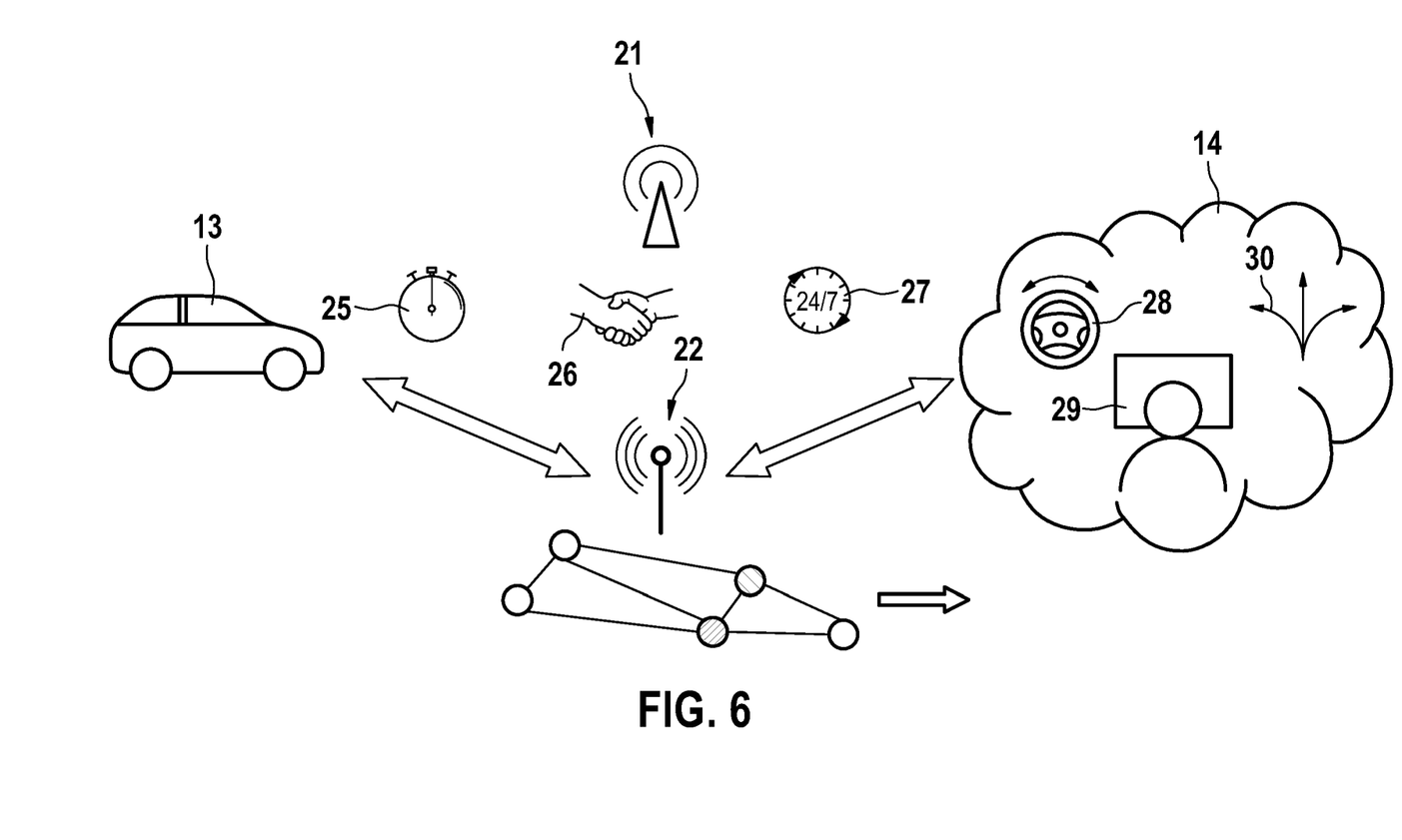
FIGS. 6 and 7 show a third application of the control program represented in FIG. 3.
Figure 7:
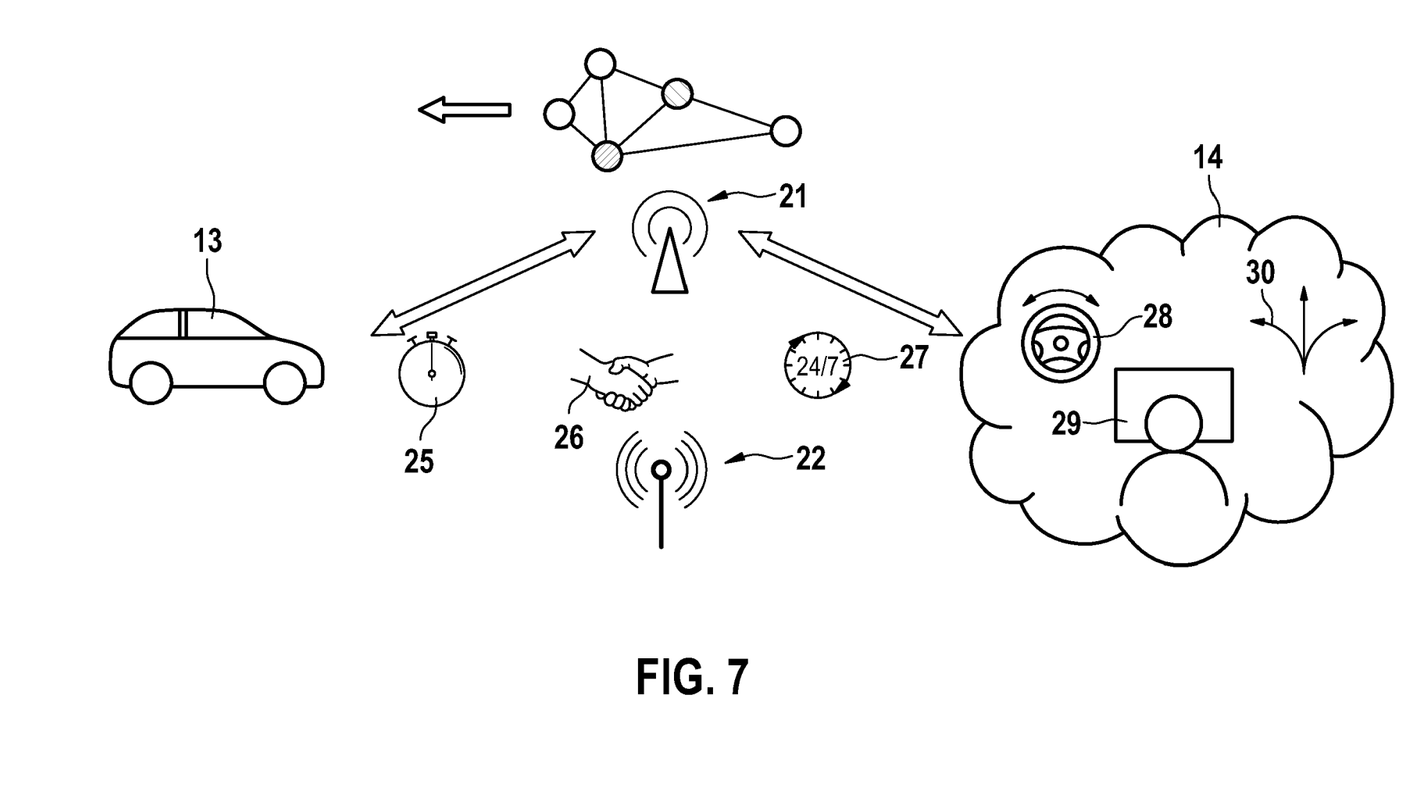

FIGS. 6 and 7 when viewed together illustrate the aspect of a dynamic function partitioning change. It should be noted in this regard that the task distribution between cloud 14 and vehicle 13 for fulfilling a particular function is usually not fixed. There is therefore the possibility of relocating smaller or larger components of the functionality from vehicle 13 to cloud 14. Thus, for example, in the case of a voice recognition, the functional component in the backend may be limited to a word recognition or the full semantic analysis of the speech elements together with their assignment to vehicle functions may take place in cloud 14; the result of such an analysis would be a direct access to the aforementioned vehicle functions. The component of applications 16, 18 operated in the backend may be adapted based on supervision 11 and the aforementioned vehicle functions and the capabilities of applications 15, 16, 17, 18. Thus, if the communication capabilities are sufficient for such purpose, more functions may be carried out in cloud 14 (FIG. 6); if on the other hand the communication is impaired, functionality would be transferred back into vehicle 13 (FIG. 7). In this way as well, application supervisor 20 is thus also able to take the functional safety requirements of applications 15, 16, 17, 18 into consideration. Supervisor 20 may further be configured to switch to the backend side or to the vehicle side between various application instances having different capabilities, or it may itself adapt the capabilities of an application instance via communication with this instance.

Figure 8:
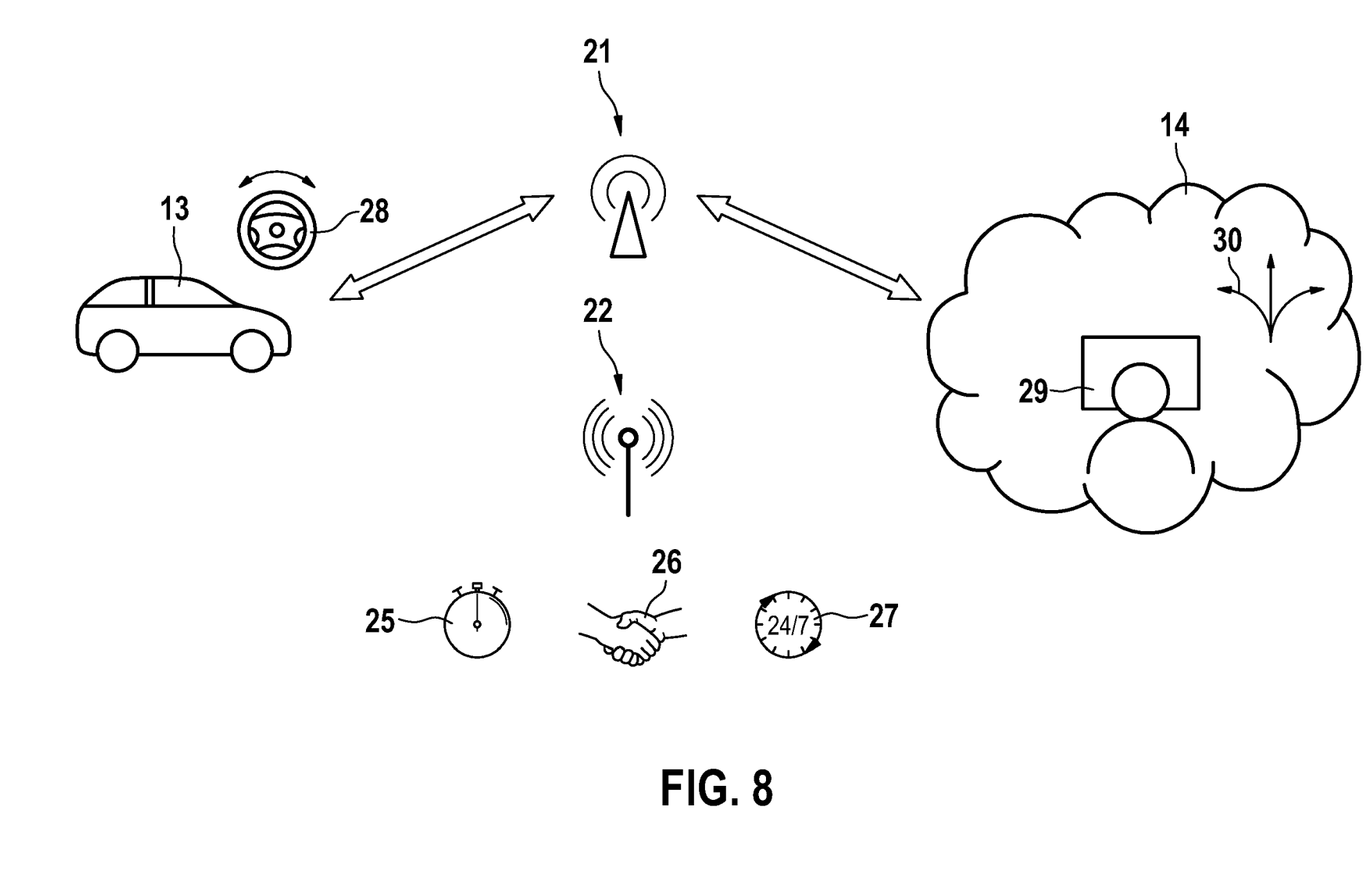
FIGS. 8 and FIG. 9 show a fourth application of the control program represented in FIG. 3.
Figure 9:
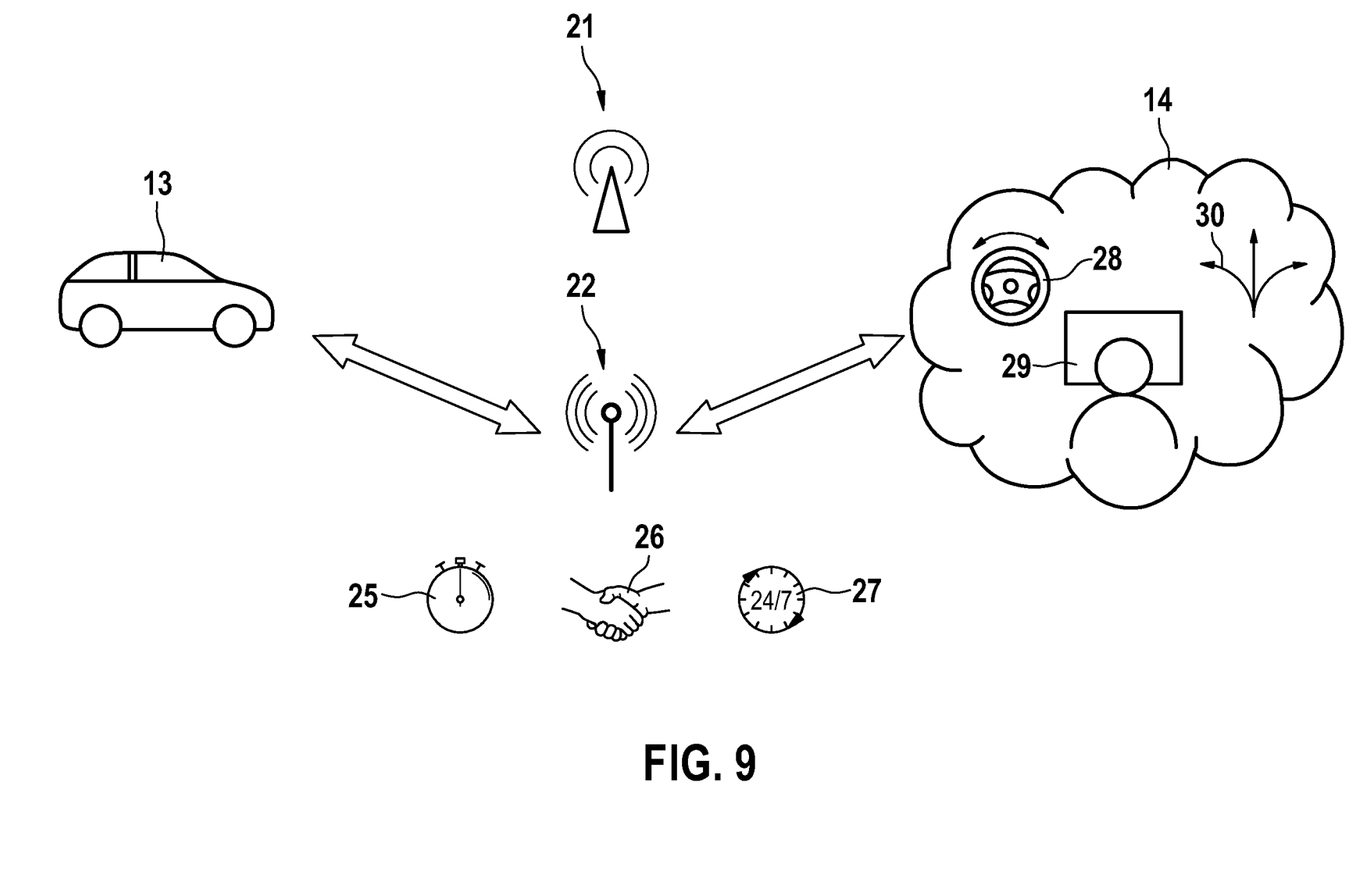

Finally, FIGS. 8 and 9 relate to the aspect of a teleoperated driving situation. In this application, it is important that teleoperator 29 has an adequate overview over the surroundings of teleoperated vehicle 13. This is achieved by sending pieces of sensor information—for example, video, radar, LIDAR or vehicle system state—from vehicle 13 or from other information sources—for example, from cameras encompassed by the public infrastructure—via communication channels 21, 22 to teleoperator 29. If the communication capabilities change and this change, both on the part of vehicle 13 as well as on the part of the backend, is precisely and reliably supervised by supervisor 20, it is possible on the one hand to dynamically change the degree of assistance by teleoperator 29 and, for example, to change from a supervision of movement path 30 of the vehicle (FIG. 8) over to the full maneuvering thereof (28) by teleoperator 29 (FIG. 9). On the other hand, the decision could be made to shift vehicle 13 into a safe state if the quality of service of utilized communication channel 20, 21 falls below a particular threshold value.

This method 10 may, for example, be implemented in software or in hardware or in a mixed from of software and hardware, for example, in a control unit.

What is claimed is:

1. A method for controlling applications distributed between a vehicle and a cloud, the method comprising:
   carrying out a supervision, via an application supervisor, of communication channels between the vehicle and the cloud; and
   carrying out, based on the supervision, a control and adaptation of a component of the applications operated in the vehicle or of a component of the applications operated in the cloud;
   wherein redundant communication channels, which are used in parallel, use a function data classification,
   wherein the communication channels are used simultaneously, wherein the application supervisor divides communication types of applications, which it controls based on their requirements into various classes and dynamically assigns the classes to the communication channels controlled and managed by the application supervisor,
   wherein the classification of application data and a distribution thereof to available communications channels takes place dynamically based on their supervision and corresponding adaptation of the functions, so that the application supervisor takes functional safety requirements of the applications into consideration,
   wherein the application supervisor supervises communication capabilities for different available communication channels and decides, based on the communication capabilities, how the functions or applications are to be adapted to the communication capabilities of the different available communication channels,
   wherein a functionality of the application is adapted to an instantaneous status of available ones of the different communication channels, and
   wherein communication is improved if both of the different communication channels are available simultaneously for a function.

2. The method as recited in claim 1, wherein a connectivity of the applications is established on the part of the vehicle using communication units and on the part of the cloud using backend connectors, and the supervision relates to the communication units and the backend connectors.

3. The method as recited in claim 1, wherein the supervision relates to one of the following operating parameters of the communication channels: a latency, or a reliability, or an availability, or a transmission capacity.

4. The method as recited in claim 3, wherein the communication channels are utilized alternatingly, and wherein the control takes place by switching between the communication channels as a function of the operating parameters.

5. The method as recited in claim 3, wherein the communication channels are utilized simultaneously, and wherein the control takes place by allocating the applications to the communication channels as a function of requirements of the applications and of the operating parameters.

6. The method as recited in claim 3, wherein functions of the applications are selectively performed by the component of the applications operated in the vehicle or by the component of the applications operated in the cloud, and wherein the control takes place by shifting the functions between the vehicle and the cloud as a function of the operating parameters.

7. The method as recited in claim 6, wherein the applications include a teleoperated driving of the vehicle, and wherein the shifted functions include a maneuvering of the vehicle.

8. A non-transitory machine-readable memory medium, on which is stored a computer program, which is executable by a processor, comprising:
   a program code arrangement having program code for controlling applications distributed between a vehicle and a cloud, by performing the following:

carrying out a supervision, via an application supervisor, of communication channels between the vehicle and the cloud; and carrying out, based on the supervision, a control and adaptation of a component of the applications operated in the vehicle or of a component of the applications operated in the cloud;

wherein redundant communication channels, which are used in parallel, use a function data classification, wherein the communication channels are used simultaneously, wherein the application supervisor divides communication types of applications, which it controls based on their requirements into various classes and dynamically assigns the classes to the communication channels controlled and managed by the application supervisor, wherein the classification of application data and a distribution thereof to available communications channels takes place dynamically based on their supervision and corresponding adaptation of the functions, so that the application supervisor takes functional safety requirements of the applications into consideration, wherein the application supervisor supervises communication capabilities for different available communication channels and decides, based on the communication capabilities, how the functions or applications are to be adapted to the communication capabilities of the different available communication channels, wherein a functionality of the application is adapted to an instantaneous status of available ones of the different communication channels, and wherein communication is improved if both of the different communication channels are available simultaneously for a function.

9. A device to control applications distributed between a vehicle and a cloud, comprising:

a non-transitory machine-readable memory medium, on which is stored a computer program, which is executable by a processor, including:

a program code arrangement having program code for controlling applications distributed between a vehicle and a cloud, by performing the following:

carrying out a supervision, via an application supervisor, of communication channels between the vehicle and the cloud; and carrying out, based on the supervision, a control and adaptation of a component of the applications operated in the vehicle or of a component of the applications operated in the cloud;

wherein redundant communication channels, which are used in parallel, use a function data classification, wherein the communication channels are used simultaneously, wherein the application supervisor divides communication types of applications, which it controls based on their requirements into various classes and dynamically assigns the classes to the communication channels controlled and managed by the application supervisor, wherein the classification of application data and a distribution thereof to available communications channels takes place dynamically based on their supervision and corresponding adaptation of the functions, so that the application supervisor takes functional safety requirements of the applications into consideration, wherein the application supervisor supervises communication capabilities for different available communication channels and decides, based on the communication capabilities, how the functions or applications are to be adapted to the communication capabilities of the different available communication channels, wherein a functionality of the application is adapted to an instantaneous status of available ones of the different communication channels, and wherein communication is improved if both of the different communication channels are available simultaneously for a function.

\* \* \* \* \*